US006707925B1

(12) United States Patent
Breithaupt

(10) Patent No.: US 6,707,925 B1
(45) Date of Patent: Mar. 16, 2004

(54) MULTI-MOUNT SPEAKER ASSEMBLY

(75) Inventor: Thomas Dean Breithaupt, Naperville, IL (US)

(73) Assignee: Robert Bosch Corporation, Broadview, IL (US)

( * ) Notice: Subject to any disclaimer, the term of this patent is extended or adjusted under 35 U.S.C. 154(b) by 306 days.

(21) Appl. No.: 09/630,119

(22) Filed: Aug. 1, 2000

Related U.S. Application Data

(60) Provisional application No. 60/174,528, filed on Jan. 5, 2000.

(51) Int. Cl.[7] .............................................. H04R 25/00
(52) U.S. Cl. .................... 381/386; 381/389; 381/395; 181/171
(58) Field of Search ................... 381/86, 302, 365, 381/386, 389, 395; 181/141, 150, 171; 24/459; 248/27.1, 505

(56) References Cited

U.S. PATENT DOCUMENTS

| 2,259,907 A | 10/1941 | Olney |
| 4,122,315 A | 10/1978 | Schroeder et al. |
| 4,146,110 A | 3/1979 | Maloney et al. |
| 4,182,429 A | 1/1980 | Senzaki |
| 4,484,658 A | * 11/1984 | Grote ......................... 381/386 |
| 4,633,972 A | * 1/1987 | DeRocher ..................... 381/86 |
| 5,299,769 A | 4/1994 | Reusche et al. |
| 5,310,149 A | 5/1994 | Struthers et al. |
| 5,360,194 A | 11/1994 | Jacobson |

FOREIGN PATENT DOCUMENTS

DE          585 748           10/1933

* cited by examiner

*Primary Examiner*—Suhan Ni
(74) *Attorney, Agent, or Firm*—Michael Best & Friedrich LLP

(57) ABSTRACT

A bracket for mounting a speaker in a vehicle. The bracket includes a speaker receiving portion for supporting the speaker, and two diametrically opposed arms extending from the speaker receiving portion. Each of the arms includes a plurality of apertures for receiving fasteners capable of fastening the bracket over a mounting hole of varying size.

21 Claims, 1 Drawing Sheet

MULTI-MOUNT SPEAKER ASSEMBLY

RELATED APPLICATIONS

This application claims priority to provisional application serial No. 60/174,528, filed on Jan. 5, 2000.

FIELD OF THE INVENTION

The invention relates to audio speakers, and more particularly to assemblies for mounting audio speakers in vehicles.

BACKGROUND OF THE INVENTION

Vehicles usually include factory installed speakers that are often replaced with new speakers and/or speakers yielding higher quality sound (collectively, aftermarket speakers). Typically, the selection of available aftermarket speakers is limited to speakers that fit in the existing mounting holes in the support structure (i.e., the dashboard or the rear window shelf). If the desired aftermarket speaker will not fit in the preexisting mounting hole, it simply cannot be used. This often occurs when the desired aftermarket speaker is too small for the existing mounting hole.

SUMMARY OF THE INVENTION

The present invention alleviates the above-identified problem and provides a speaker assembly capable of being mounted over substantially any existing mounting hole. Preferably, the invention provides a speaker assembly for mounting a tweeter in mounting holes ranging from 3.5 to 6.5 inches in diameter. It should be noted, however, that the speaker assembly can include any type of speaker and can be mounted over any size mounting hole. This assists in mounting aftermarket speakers in the pre-existing mounting holes in a vehicle.

More specifically, the present invention provides a bracket for mounting a speaker in a vehicle. The bracket includes a speaker receiving portion for supporting the speaker, and two diametrically opposed arms extending from the speaker receiving portion. Each of the arms includes a plurality of apertures for receiving fasteners capable of fastening the bracket over a mounting hole of varying size. Preferably, the bracket is made from a single piece of material.

Other features and advantages of the invention will become apparent to those skilled in the art upon review of the following detailed description, claims, and drawings.

Figure 1:
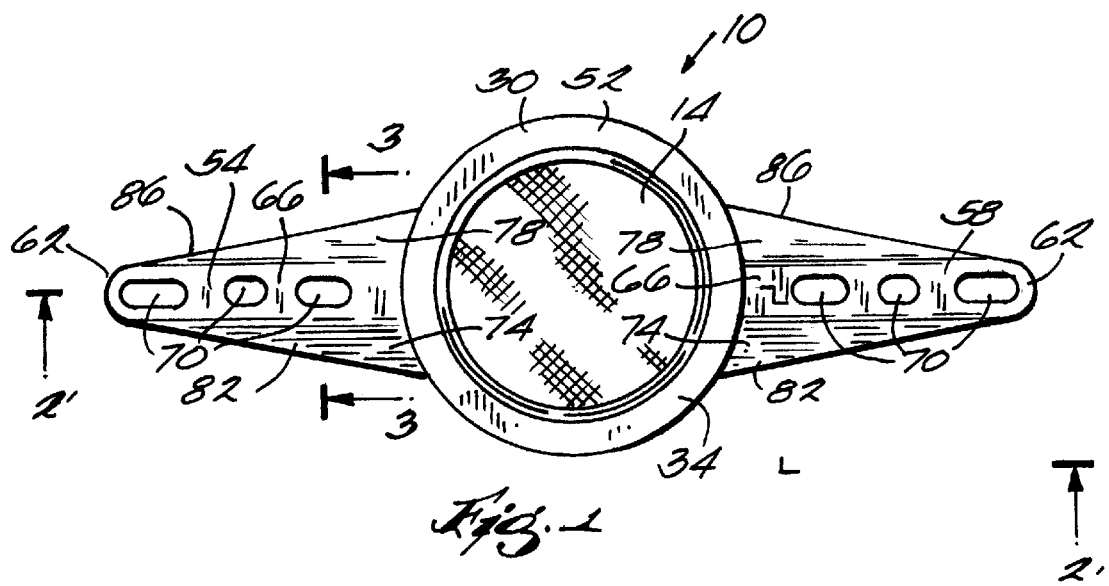
FIG. 1 is a top view of a speaker assembly embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 2:
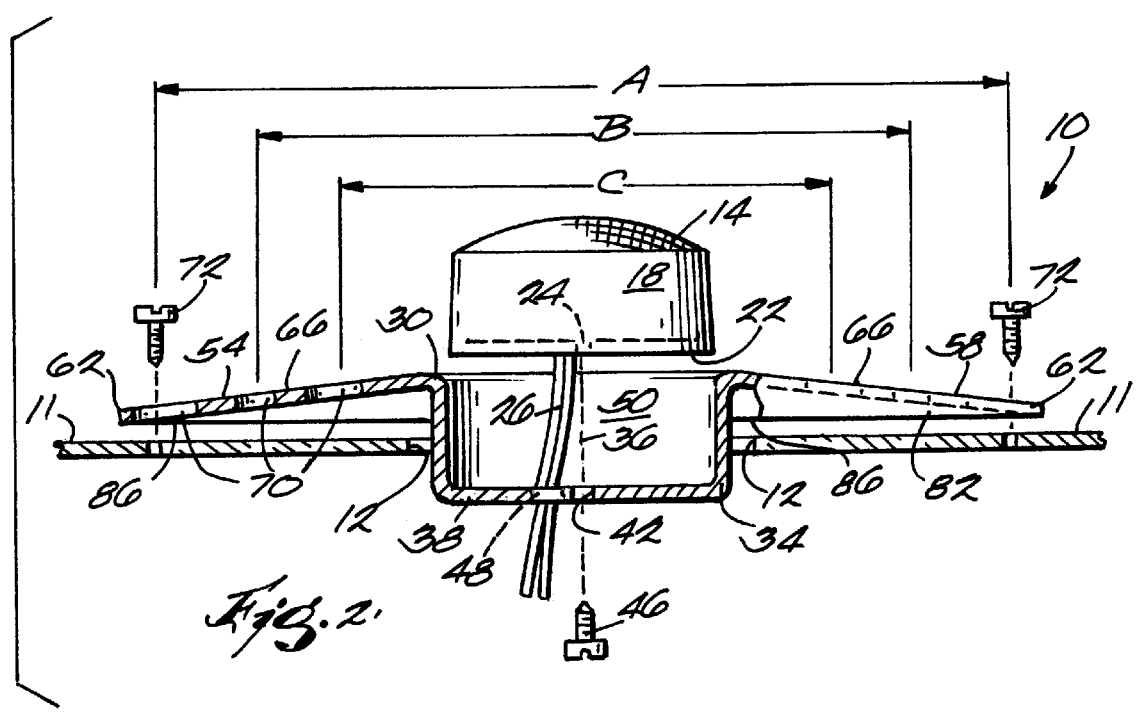
FIG. 2 is a partial section view taken along line 2—2 in FIG. 1.
Figure 3:
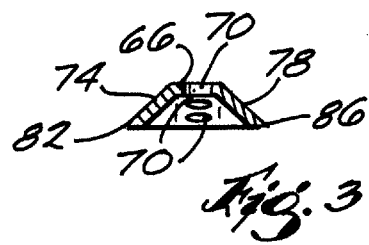
FIG. 3 is a partial section view taken along line 3—3 in FIG. 1.

FIGS. 1–3 illustrate a speaker mounting assembly 10 embodying the invention. The speaker mounting assembly is preferably used for mounting speaker in vehicles. The speaker mounting assembly 10 is mountable (see FIG. 2) on a mounting surface 11 having therein a mounting hole 12. The mounting hole 12 can vary in size, and is preferably 3.5 to 6.5 inches in diameter. The mounting surface 11 is typically a dashboard or rear window shelf as is commonly understood. The speaker mounting assembly includes a speaker 14, preferably a tweeter, having (see FIG. 2) a housing 18 with a bottom surface 22. As used herein, the term "bottom" is used only for convenience and does not imply any particular orientation. The bottom surface 22 has therein a threaded hole 24 for receiving a mounting screw (described below). Speaker wires 26 extend from the bottom surface 22 of the housing 18 for connection to another component (not shown).

The speaker mounting assembly 10 also includes a mounting bracket 30 that includes a central speaker receiving portion 34. In the preferred embodiment, the speaker receiving portion 34 has a central axis 36 and is substantially cup-shaped to receive the speaker 14. The speaker receiving portion 34 fits at least partially in the mounting hole 12 and includes a substantially planar and circular bottom support wall 38 for supporting the bottom surface 22 of the speaker housing 18. The bottom support wall 38 has therein a first, central aperture 42 that is substantially coaxial with the threaded hole 24 when the speaker 14 is seated in the speaker receiving portion 34. A fastener or screw 46 is inserted through the aperture 42 and into the threaded hole 24 to secure the speaker 14 to the mounting bracket 30. The bottom support wall 38 also includes a second aperture 48 (shown in phantom in FIG. 2) through which the speaker wires 26 pass.

The speaker receiving portion 34 also includes an annular or cylindrical side wall 50 that extends from the bottom support wall 38 to substantially surround the side wall of the speaker housing 18. It is important to note that the speaker receiving portion 34 need not be generally cylindrical, but could be any other shape and could receive any shape speaker. As best seen in FIG. 1, an annular flange or rim 52 extends from the side wall 50.

The mounting bracket 30 further includes first and second mounting arms 54 and 58, respectively. Together, the arms 54, 58 support the speaker receiving portion 34 in the mounting hole 12. The arms 54, 58 extend from diametrically opposed sides of the speaker receiving portion 34. The arms 54, 58 are substantially identical and only one will be described in detail. Like parts are indicated by like reference numerals. While only one arm could be used, two arms are preferred to eliminate vibration and rattling.

The arm 54 has a distal end 62 and includes a generally planar central or fastening portion 66 that slopes toward the mounting surface 11 as shown in FIG. 2. The central portion 66 includes a plurality of apertures, preferably elongated slots 70, spaced from the circular side wall 50 to the end 62. FIG. 2 shows the preferred spacing of the elongated slots 70, with reference numeral A representing a distance of approximately 149 mm, reference numeral B representing a distance of approximately 117 mm, and reference numeral C representing a distance of approximately 89 mm. Other spacing and configurations of elongated slots 70 can also be used.

The elongated slots 70 can receive fasteners 72 that fasten the mounting bracket 30 to the mounting surface 11. The elongated slots 70 permit the mounting bracket 30 to be mounted over preexisting mounting holes 12 of varying sizes. With smaller mounting holes 12 (like the one shown in FIG. 2), the mounting bracket 30 can be fastened to the mounting surface 11 at any of the elongated slots 70 since all of the elongated slots 70 are above the mounting surface 11. With larger mounting holes (not shown) it may be necessary to use the elongated slots 70 closer to the end 62 as the elongated slots 70 closest to the circular side wall 50 will be positioned above the mounting hole 12.

As best seen in FIGS. 1 and 3, the arm 54 also includes generally planar flanges 74 and 78 that extend downward at an angle from respective sides of the central portion 66 to respective terminal edges 82 and 86. The terminal edges 82, 86 lie in a plane substantially normal to the axis 36 and are engageable with (see FIG. 2) the mounting surface 11 to support the arm 54. The angled configuration of the flanges 74, 78 provides added rigidity to the bracket 30.

The mounting bracket 30 is preferably made from a single piece of metal or plastic and can be formed in any suitable manner. If made from metal, the mounting bracket 30 is preferably stamped. If made from plastic, the mounting bracket 30 is preferably injection molded. It is also important to note that the speaker 14 can be inserted into the mounting bracket 30 prior to fastening the mounting bracket 30 to the mounting support 11 or, alternatively, can be inserted after the mounting bracket 30 is fastened to the mounting support 11.

Various features of the invention are set forth in the following claims.

What is claimed is:

1. A bracket for mounting a speaker in a vehicle, the bracket comprising:
    a speaker receiving portion for supporting the speaker; and
    two generally co-planar, angularly spaced arms extending from the speaker receiving portion, each of the arms configured to engage a substantially planar mounting surface and each of the arms including a plurality of apertures for receiving fasteners capable of fastening the bracket to the mounting surface and over a mounting hole defined in the mounting surface;
    wherein each of the arms includes an end and a generally planar central portion extending between the speaker receiving portion and the end, the apertures being formed in the respective central portions.

2. The bracket of claim 1, wherein the apertures are spaced such that the bracket can be mounted over a mounting hole ranging in size from approximately 3.5 to 6.5 inches in diameter.

3. The bracket of claim 1, wherein at least one of the plurality of apertures in each arm is an elongated slot.

4. The bracket of claim 1, wherein each of the arms further includes opposing generally planar flanges extending from the central portion.

5. The bracket of claim 4, wherein the flanges meet the central portion at an angle.

6. The bracket of claim 4, wherein the flanges include respective terminal edges that engage the mounting surface when the bracket is fastened over the mounting hole.

7. The bracket of claim 6, wherein all of the terminal edges lie in the same plane.

8. The bracket of claim 1, wherein the speaker receiving portion includes a generally planar and circular speaker support wall and an annular side wall extending from the speaker support wall, the annular side wall terminating in an upper rim.

9. The bracket of claim 8, wherein the generally planar central portion extends from the upper rim to the end in a direction at least partially toward the speaker support wall.

10. The bracket of claim 1, wherein the arms and the speaker receiving portion are formed from a single piece of material.

11. The bracket of claim 10, wherein the material is one of a metal and a plastic.

12. The bracket of claim 1, wherein the arms are diametrically opposed.

13. A speaker assembly capable of being mounted over a preexisting mounting hole in the dashboard or rear window shelf of a vehicle, the preexisting mounting hole ranging from 3.5 to 6.5 inches in diameter, the speaker assembly comprising:
    a speaker; and
    a bracket for supporting the speaker over the preexisting mounting hole, the bracket including a cup-shaped central speaker receiving portion for supporting the speaker, and diametrically opposed, substantially rigid arms extending from the central speaker receiving portion, each of the arms engaging a mounting surface on the dashboard or rear window shelf such that the bracket spans the preexisting mounting hole and supports the speaker over the preexisting mounting hole.

14. The speaker assembly of claim 13, wherein each of the arms includes a plurality of spaced-apart apertures for receiving fasteners capable of fastening the bracket to the mounting surface.

15. The speaker assembly of claim 14, wherein the apertures are spaced such that even when mounted over the largest preexisting mounting hole, at least one aperture on each arm will overlie the mounting surface surrounding the preexisting mounting hole.

16. The speaker assembly of claim 14, wherein the apertures are elongated slots.

17. The speaker assembly of claim 13, wherein the bracket is formed from a single piece of material.

18. The speaker assembly of claim 17, wherein the material is metal.

19. The speaker assembly of claim 17, wherein the material is plastic.

20. The speaker assembly of claim 13, wherein the arms of the bracket are generally co-planar.

21. A speaker assembly comprising:
    a speaker; and
    a speaker mounting assembly for mounting the speaker over a mounting hole of varying size, the speaker mounting hole being defined by a mounting surface, the speaker mounting assembly including
        a substantially cylindrical speaker receiving portion for supporting the speaker, the speaker receiving portion including a generally planar and circular speaker support wall and an annular side wall extending from the speaker support wall and terminating at a rim, and
        diametrically opposed arms extending from the speaker receiving portion, each arm including an end, a generally planar central portion extending between the rim of the speaker receiving portion and the end, a plurality of elongated slots defined in the central portion for receiving fasteners capable of fastening the speaker mounting assembly over the mounting hole, and generally planar flanges extending at an angle from the central portion, the flanges including respective terminal edges that engage the mounting surface when the speaker mounting assembly is fastened over the mounting hole;

the speaker mounting assembly being formed from a single piece of material.

* * * * *